UNITED STATES PATENT OFFICE.

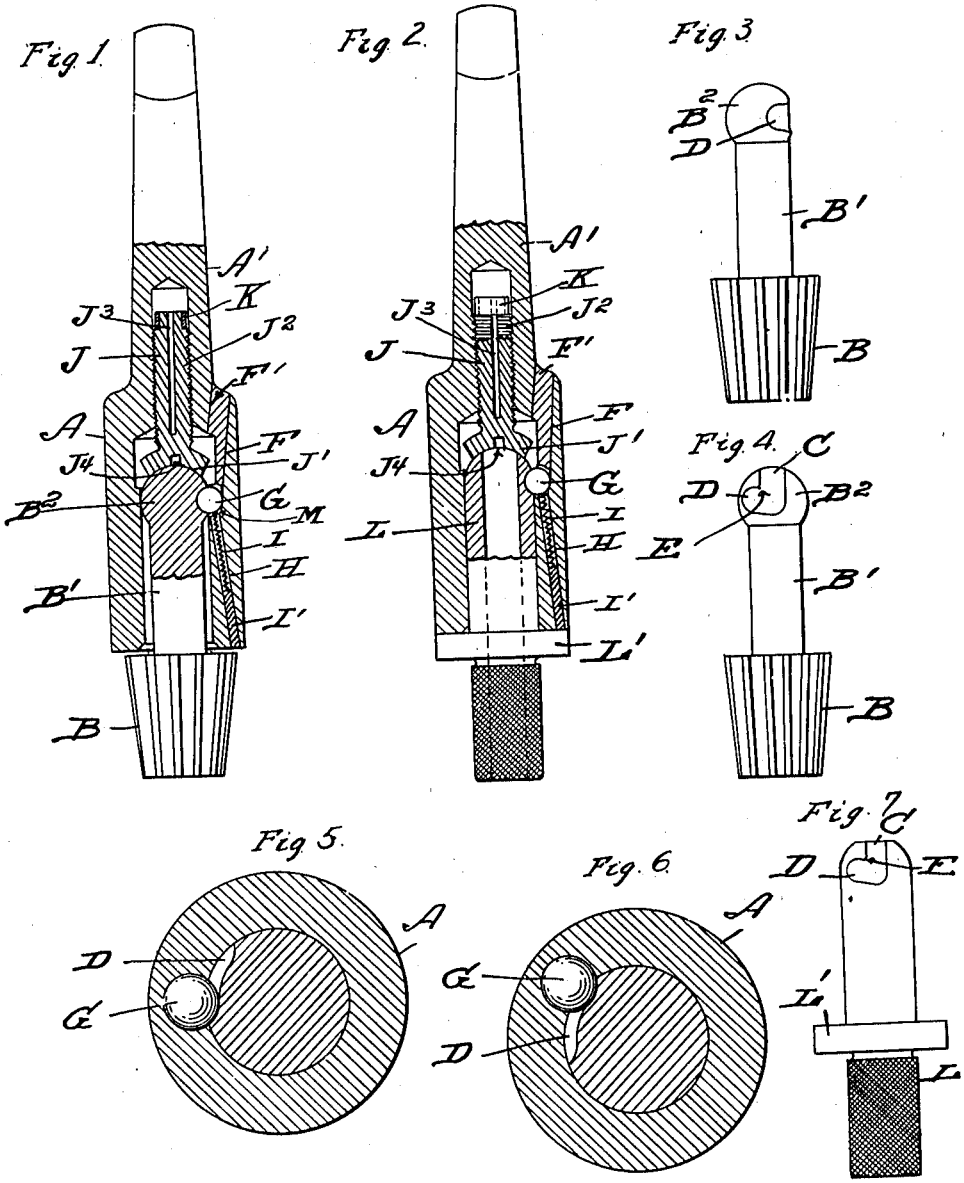

EMIL GAIRING, OF DETROIT, MICHIGAN, ASSIGNOR TO THE GAIRING-NEEDHAM TOOL CO., INC., OF DETROIT, MICHIGAN, A CORPORATION OF MICHIGAN.

FLOATING-TOOL HOLDER.

1,311,960. Specification of Letters Patent. Patented Aug. 5, 1919.

Application filed May 31, 1918. Serial No. 237,615.

*To all whom it may concern:*

Be it known that I, EMIL GAIRING, citizen of the United States, residing at Detroit, county of Wayne, State of Michigan, have invented a certain new and useful Improvement in Floating-Tool Holders, and declare the following to be a full, clear, and exact description of the same, such as will enable others skilled in the art to which it pertains to make and use the same, reference being had to the accompanying drawings, which form a part of this specification.

My invention relates to a floating tool holder, its coöperating shank, and the co-ordinating means for adjusting the holder, whereby the latter may receive and support the tool, as shown in the accompanying drawings and more particularly pointed out in the following specification and claims.

One object of this invention is to provide a tool holder which is adapted to receive and drive a "floating tool" having a limited universal movement that it may automatically adjust itself to its work.

Another feature of the invention is the means for controlling the adjustment of a thrust pin, carried by the holder, having a concave end, with which the convex or ball-shaped end of the tool shank articulates.

Another feature of the invention is the expansible shank of the thrust pin which serves to maintain the thrust pin in its adjusted position against accidental displacement.

Another feature of the invention is the means for maintaining the shank of the tool in a locked driving relation to the holder, while admitting of a universal tilting movement of the tool supported thereby.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made without departing from the spirit of the same.

In the accompanying drawings:—

Figure 1 is a longitudinal central sectional view of the holder with a taper reamer in position, showing parts in elevation.

Fig. 2 is a similar sectional view of the holder with a coöperating gage or templet lodged in the socket of the holder that the thrust pin of the holder may be properly positioned to receive the end of the tool shank when inserted therein.

Fig. 3 is an elevation of a taper reamer showing the ball-shaped end of its shank portion as viewed from one side.

Fig. 4 is a similar view of the tool indicated in the preceding figure, showing the ball-shaped end of the shank as when viewed at right angles to Fig. 3.

Fig. 5 is a cross-sectional view through the holder and tool shank, (on a relatively larger scale) showing the locking ball as on first entering the longitudinal groove in the ball-shaped end of the tool shank.

Fig. 6 is a similar cross-sectional view through the holder and tool shank, showing the position of the ball upon locking the tool in the holder.

Fig. 7 is an elevation of the gage removed from the holder.

Referring now to the letters of reference placed upon the drawings, A, denotes a socket provided with a tapering shank A'.

B, indicates a taper reamer or other tool, having a shank B', loosely housed in the socket of the holder and provided at its inner end with a ball-shaped or convex end B².
C, indicates a short longitudinal groove in the periphery of the ball-shaped end of the shank, from which opens a transverse peripheral groove D, having a slight upward inclination as indicated in Fig. 4 of the drawings:—forming a sharply rounded and downwardly directed corner E, between the longitudinal and upwardly directed transverse grooves to more effectually retain the ball when in its locked relation.

F, indicates a downwardly directed inclined hole bored from the shoulder in the member A, toward its socket in which is lodged a ball G, which partially seats itself in the longitudinal groove C, of the tool shank when the latter is inserted in the holder.

F', indicates a plug for closing the upper end of the hole F.

H, indicates an inclined hole of relatively small diameter extending upwardly from the lower edge of the socket member A, and opening into the hole F, directly below the seat of the ball G. I, indicates a spring in the hole H, which serves to slightly lift the ball from its seat. I', indicates a plug for closing the lower end of the hole H, against which the spring bears.

J, denotes a thrust pin having a concave head J', adapted to receive and articulate with the convex or ball-shaped end B², of the shank of the tool B.

The stem J², of the thrust pin has a screw-threaded engagement with the shank A', of the holder and is divided longitudinally for a portion of its length as indicated at J³, and is sprung apart sufficiently to provide resilient action that it may maintain its position in the holder against accidental displacement when manually adjusted.

K, indicates a collar embracing the ends of the stem J². J⁴, is a kerf cut in the concave head J', of the thrust pin to receive the blade of a screw driver for purposes of adjustment.

L, denotes a gage or templet of tubular form having a convex or arc-shaped end adapted to register with the concave end of the thrust pin and with longitudinal and transverse grooves C, and D, similar to those on the ball-shaped end of the tool shank.

L', is a flange or collar projecting from the body of the gage adapted to bear against the end of the tool-holder (as shown in Fig. 2) thus serving as a guide for the adjustment of the thrust pin,—which may be properly positioned by means of a screw-driver inserted through the tubular body of the gage.

It will now be evident that upon a proper adjustment of the thrust pin with the coöperation of the gage that the pin will be in position to articulate with the end of the tool when inserted in the holder;—and that the grooves in the convex end of the tool shank will also be in position to coördinate with the ball in the holder to secure the tool therein.

It will be noted that the shank of the tool is of relatively smaller diameter than the bore of the holder, to admit of a limited universal movement of the tool in the holder;—the convex end of the tool shank and the concave end of the thrust pin, with which it articulates, permitting the tool to adjust itself to the work while in locked or driving relation with the holder by means of the ball G.

In order that the tool may be free to tilt in any direction and still be secured by the ball in driving relation with the holder, the horizontal axis of the locking ball and the horizontal axis of the ball-shaped end of the tool shank should be in alinement when in locked relation to the holder thereby leaving a slight clearance M, below the ball in the bore formed in tool holder, as indicated in Fig. 1. The spring I, which bears directly against the ball serves to lift it slightly from its seat in the holder, and thus when the tool tilts the ball will not bind against the seat in the holder, but will admit of the tool shank tilting in any direction.

The gage L, which is provided with grooves to receive the ball G, when inserted in the holder is given a slight rotation drawing the ball down to its seat against the action of the spring I, leaving no clearance beneath the ball, as indicated in Fig. 2. The distance from the axis of the groove D, to the end of the gage is slightly longer than between the same points on the tool shank; therefore when the thrust pin J, has been adjusted to articulate with the end of the gage L, it will be found that when the tool shank has been inserted in place of the gage that a clearance has been provided for under the ball, and the latter lifted under the action of the spring I, sufficiently to admit of a tilting movement of the tool as previously explained.

No claim is made in the present application to the removable gage which forms the subject matter of a divisional application filed March 27, 1919, Ser. No. 285,480.

Having thus described my invention what I claim is:—

1. In a device of the character described, a tool holder having a socket to receive a tool shank, a tool having a shank loosely fitted to the socket of the holder and provided with a convex end articulating with the holder to adapt it for a limited universal movement with respect to the holder to permit a tilting of the tool in any direction, and a ball lodged in a bore provided in the holder adapted to enter a groove formed in the convex end of the tool shank, whereby the tool may be locked in the holder without interfering with the limited universal movement of the tool.

2. In a device of the character described, a tool holder having a socket to receive a tool shank, an adjustable thrust pin screwed into the holder provided with a concave head to receive the end of a tool shank, a tool having a shank loosely fitted in the socket of the holder with a convex end articulating with the concave head of the thrust pin and permitting the tool to have a limited universal movement, whereby the tool is adapted to be tilted in any direction, and a ball lodged in a bore in the holder adapted to project into a groove in the convex end of the tool shank, whereby the tool may be locked to operate with the holder without interfering with the limited universal movement of the tool.

3. In a device of the character described, a tool holder having a socket to receive a tool shank, an adjustable resilient thrust pin screwed into the holder provided with a concave head, a tool having a shank loosely fitted in the socket of the holder and adapted to articulate with the concave head of the thrust pin, and permitting the tool to have a limited universal movement, whereby the tool is adapted to be tilted in any direction, and means for locking the tool in the holder without interfering with the limited universal movement of the tool with reference to the holder while in driving operative relation therewith.

4. In a device of the character described, a tool holder having a socket to receive a tool shank, an adjustable screw threaded stem, divided for a portion of its length that it may be expanded to provide resilient action, screwed into the shank of the holder, a concave head carried by the adjustable stem and housed in the socket portion of the holder, a tool having a shank loosely fitted in the socket of the holder rounded at its end to articulate with the concave head of the adjustable stem, and a ball, lodged in a bore provided in the holder, adapted to enter grooves provided in the rounded end of the tool shank to lock the tool in the holder.

5. In a device of the character described, a tool holder having a socket to receive a tool shank, an adjustable thrust pin screwed into the holder provided with a concave head to receive the end of a tool shank, a tool having a shank loosely fitted in the holder having a convex head articulating with the concave head of the thrust pin, a ball lodged in a bore in the holder adapted to project into a groove in the convex end of the tool shank, and a spring adapted to lift said ball whereby a clearance may be provided beneath it that will admit of the automatic adjustment of the tool to its work while in locked driving relation to the holder.

In testimony whereof, I sign this specification in the presence of two witnesses.

EMIL GAIRING.

Witnesses:
S. E. THOMAS,
NELSON H. HOUSE.